United States Patent
Fan et al.

(10) Patent No.: US 10,459,580 B2
(45) Date of Patent: Oct. 29, 2019

(54) TOUCH SCREEN AND TOUCH DEVICE (71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Haoyuan Fan, Beijing (CN); Xu Liu, Beijing (CN); Fengzhi Zhu, Beijing (CN); Xiang Yu, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 0 days.

(21) Appl. No.: 15/547,144

(22) PCT Filed: Feb. 15, 2017

(86) PCT No.: PCT/CN2017/073576
§ 371 (c)(1),
(2) Date: Jul. 28, 2017

(87) PCT Pub. No.: WO2017/193659
PCT Pub. Date: Nov. 16, 2017

(65) Prior Publication Data
US 2019/0056815 A1 Feb. 21, 2019

(30) Foreign Application Priority Data
May 9, 2016 (CN) .......................... 2016 1 0300661

(51) Int. Cl.
*G06F 3/044* (2006.01)

(52) U.S. Cl.
CPC .................................. *G06F 3/044* (2013.01)

(58) Field of Classification Search
CPC ....................................................... G06F 3/044
(Continued)

(56) References Cited

U.S. PATENT DOCUMENTS

| 2013/0063371 A1 | 3/2013 | Lee et al. |
| 2014/0152613 A1 | 6/2014 | Ishizaki et al. |

(Continued)

FOREIGN PATENT DOCUMENTS

| CN | 102364421 A | 2/2012 |
| CN | 103853377 A | 6/2014 |

(Continued)

OTHER PUBLICATIONS

International Search Report and Written Opinion for Application No. PCT/CN2017/073576, dated May 8, 2017, 8 Pages.

*Primary Examiner* — Michael Pervan
(74) *Attorney, Agent, or Firm* — Brooks Kushman P.C.

(57) ABSTRACT

A touch screen and a touch device are provided. The touch screen includes a substrate and a plurality of touch electrodes on the substrate arranged at a same layer and in a matrix. Each of the plurality of touch electrode includes at least two sub-electrode wires, and the at least two sub-electrode wires are connected in sequence to form a polyline-shape. The substrate includes a plurality of sub-regions, each of the plurality of sub-region includes at least one touch electrode, and the at least one touch electrodes at a same sub-region are of an identical pattern. The plurality of sub-regions includes at least two sub-regions, and respective touch electrodes of the at least two sub-regions are of different patterns.

20 Claims, 5 Drawing Sheets

(58) Field of Classification Search
USPC .................. 178/18.01–19.07; 345/173–178
See application file for complete search history.

(56) References Cited

U.S. PATENT DOCUMENTS

| | | | |
|---|---|---|---|
| 2016/0092004 A1* | 3/2016 | Yoshiki | G06F 3/047 |
| | | | 345/174 |
| 2016/0178949 A1 | 6/2016 | Wang et al. | |
| 2018/0032169 A1* | 2/2018 | Kwak | G06F 3/044 |

FOREIGN PATENT DOCUMENTS

| | | |
|---|---|---|
| CN | 204229379 U | 3/2015 |
| CN | 104570418 A | 4/2015 |
| CN | 106020531 A | 10/2016 |

\* cited by examiner

TOUCH SCREEN AND TOUCH DEVICE

CROSS-REFERENCE TO RELATED APPLICATIONS

This application is the U.S. national phase of PCT Application No. PCT/CN2017/073576 filed on Feb. 15, 2017, which claims priority to Chinese Patent Application No. 201610300661.5 filed on May 9, 2016, the disclosures of which are incorporated in their entirety by reference herein.

TECHNICAL FIELD

The present disclosure relates to the field of touch display technology, and in particular to a touch screen and a touch device.

BACKGROUND

In recent years, the capacitive touch screen technology is rapidly developing in the display technology field. The capacitive touch technology is mainly divided into In-Cell technology, One Glass Solution (OGS) technology and On-Cell technology. The On-Cell technology refers to integrating touch electrodes at the outside of a substrate of a display panel. The process of the On-Cell technology is simple, and the related devices are not required to be remodeled, so the On-Cell technology is adopted by most of the panel manufactures. The On-Cell technology further includes Multi-layer On Cell (MLOC) technology and Single-layer On Cell (SLOC) technology, and the latter is more advantageous since it requires only one exposure process, so the SLOC technology is becoming a mainstream solution of the On Cell touch screen technology.

However, for the SLOC touch screen in the related art, when viewing the touch screen from a certain angle, alternant dim and bright stripes may appear since a part of wires reflect light while a part of wires does not reflect light. As a result, the display effect of the display device is adversely affected.

SUMMARY

In view of this, a touch screen and a touch device are provided in the present disclosure, so as to solve the technical issues of the appearance of alternate dark and bright stripes when viewing a touch screen from a certain angle since a part of wires reflect light while a part of wires does not reflect light.

To solve the above technical issues, a touch screen is provided in the present disclosure, including a substrate and a plurality of touch electrodes on the substrate arranged at a same layer and in a matrix, wherein each of the plurality of touch electrode includes at least two sub-electrode wires, and the at least two sub-electrode wires are connected in sequence to form a polyline shape. The substrate includes a plurality of sub-regions, each of the plurality of sub-region includes at least one touch electrode, and the at least one touch electrodes at a same sub-region is of an identical pattern. The plurality of sub-regions includes at least two kinds of sub-regions, and the touch electrodes of the at least two kinds of sub-regions are of different patterns.

Optionally, the sub-regions are arranged in a matrix, the sub-regions in a same row or column include at least a first sub-region and a second sub-region, and a pattern of the at least one touch electrode of the first sub-region is different from a pattern of the at least one touch electrode of the second sub-region.

Optionally, the first sub-region includes a first sub-electrode wire, the second sub-region includes a second sub-electrode wire, the first sub-electrode wire and the second sub-electrode wire are in a same row or column, and the first sub-electrode wire is not parallel with the second sub-electrode wire.

Optionally, the first sub-electrode wire and the second sub-electrode wire are arranged in a form of a Chinese character "八" or an inverted Chinese character "八".

Optionally, a bending angle of the at least one touch electrode of the first sub-region is different from a bending angle of the at least one touch electrode of the second sub-region.

Optionally, the first sub-region and the second sub-region are arranged alternately.

Optionally, the plurality of sub-regions is of an identical size.

Optionally, each sub-region includes at least one row of touch electrodes and at least one column of touch electrodes.

Optionally, among the sub-regions in a same row or column, the touch electrodes at odd-numbered sub-regions are of an identical pattern, the touch electrodes at even-numbered sub-regions are of an identical pattern, and the pattern of the touch electrodes of the odd-numbered sub-regions is different from the pattern of the touch electrodes the even-numbered sub-regions.

Optionally, the touch electrode of a sub-region is arranged axisymmetrically with the touch electrode of an adjacent sub-region in a same row or column.

Optionally, the touch electrodes include a driving electrode and a sensing electrode, the driving electrode is arranged at one of two adjacent sub-regions in a same row or column, and the sensing electrode is arranged at the other of the two adjacent sub-regions in the same row or column.

Optionally, the touch screen further includes a supplementary pattern. The supplementary pattern is arranged between two adjacent sub-regions having different touch electrode patterns to fill a blank region between the two adjacent sub-regions.

Optionally, the touch screen is a single-layer and out-cell touch screen.

A touch device including the above touch screen is further provided in the present disclosure.

According to the present disclosure, the substrate of the touch screen includes at least two sub-regions, and respective touch electrodes of the at least two sub-regions are of different patterns. Therefore, the sub-electrode wires in a same row or column and at different sub-regions may extend in different directions, and edges of the sub-electrode wires running in different directions may not reflect light beams to an identical direction, so it is possible to interrupt the consecutive dark and bright stripes caused by the sub-electrode wires in a same row and column and running in an identical direction, thereby optimizing the display effect.

DETAILED DESCRIPTION

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
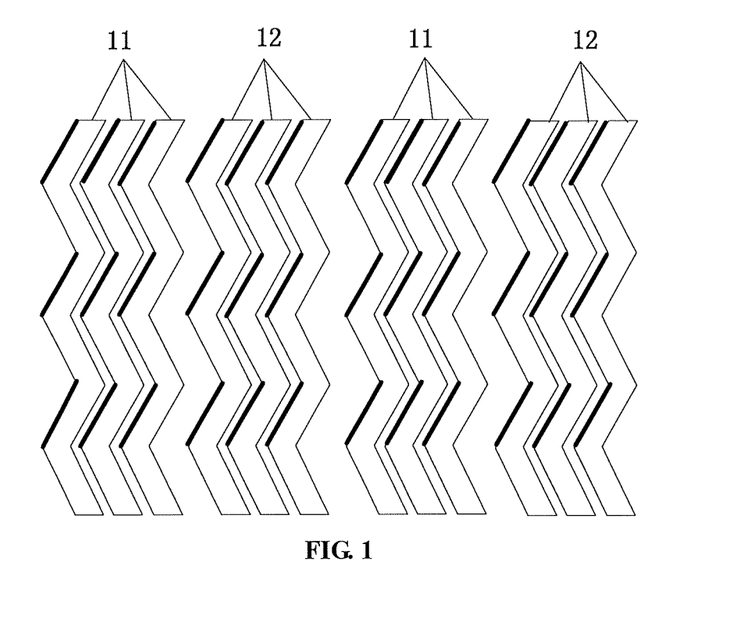
FIG. 1 is a schematic view of a SLOC touch screen in the related art.
Figure 2:
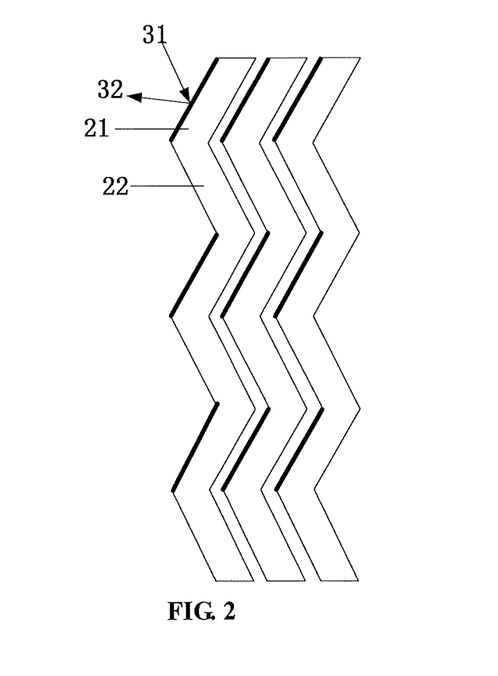
FIG. 2 is an enlarged view of touch electrodes shown in FIG. 1.
Figure 3:
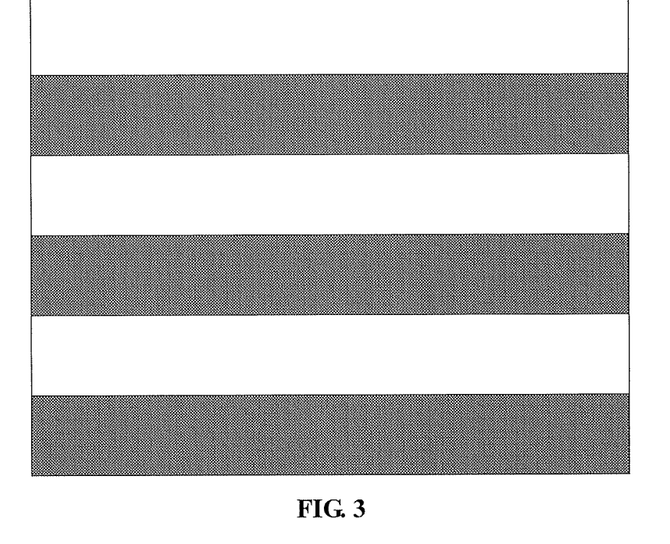
FIG. 3 is a schematic view of dim and bright stripes alternating longitudinally on a touch screen in the related art.

Referring to FIG. 1 which is a schematic view of a SLOC touch screen in the related art. The SLOC touch screen includes touch driving electrodes (TX) 11 and touch sensing electrodes (RX) 12 arranged at the same layer. The touch driving electrodes 11 and the touch sensing electrodes 12 are both polyline-shaped. The touch driving electrodes 11 and the touch sensing electrodes 12 are generally made of a transparent metallic oxide (e.g., ITO). Referring to FIG. 2, an edge of an electrode wire includes a slope, and ambient light beams 31 may be reflected by the slope to be light beams 32. Furthermore, each touch electrode is polyline-shaped and includes wires 21 running in two directions respectively, so when viewing the touch screen from a certain angle, it is only able to see the light beams reflected by the wires running in one direction, while it is unable to see the light beams reflected by the wires running in the other direction. As shown in FIG. 2, only the light beams reflected by the wires 21 can be seen. In FIG. 1 and FIG. 2, the black thickened lines represent the portions of the touch electrodes which reflect light beams when viewing the touch screen from a certain angle. Referring to FIG. 3, the display appears macroscopically as the dark and bright stripes alternating longitudinally, and then the display effect of the display device is adversely affected greatly.

A touch screen is provided in some embodiments of the present disclosure, including a substrate and a plurality of touch electrodes on the substrate arranged at the same layer and in a matrix, where each touch electrode includes at least two sub-electrode wires, and the sub-electrode wires are connected in sequence to form a polyline shape. The substrate includes a plurality of sub-regions, each sub-region includes at least one touch electrode, and the touch electrodes at the same sub-region are of an identical pattern. The sub-regions include at least two kinds of sub-regions, and respective touch electrodes of the above at least two kinds of sub-regions are of different patterns.

The sub-electrode wires being connected in sequence refers to connecting the sub-electrode wires end to end in sequence. For example, the touch electrode includes three sub-electrode wires, a tail end of a first sub-electrode wire is connected to a head end of a second sub-electrode wire, and a tail end of the second sub-electrode wire is connected to a head end of a third sub-electrode wire.

Two touch electrodes being of an identical pattern refer to that the two touch electrodes may have identical outlines. Two touch electrodes being of different patterns refer to that the two touch electrodes may have different outlines.

Due to the two sub-regions having different patterns of touch electrodes, the sub-electrode wires in the same row or column and at different sub-regions may extend in different directions, and edges of the sub-electrode wires running in different directions may not reflect light beams to the same direction, so it is possible to interrupt the consecutive dark and bright stripes caused by the sub-electrode wires in the same row and column and running in the same direction, thereby optimizing the display effect.

The running direction of the sub-electrode wire refers to an extension direction thereof, and the sub-electrode wires extending in different directions are not parallel.

In the embodiments of the present disclosure, the regions may be divided arbitrarily. Optionally, the sub-regions are arranged in a matrix.

In order to reduce the consecutive dark and bright stripes caused by the sub-electrode wires in the same row and column and running in the same direction, optionally the sub-regions in the same row or column include at least a first sub-region and a second sub-region, and respective touch electrodes of the first sub-region and the second sub-region are of different patterns.

Optionally, the first sub-region includes a first sub-electrode wire, the second sub-region includes a second sub-electrode wire, the first sub-electrode wire and the second sub-electrode wire are in the same row or column, and the first sub-electrode wire is not parallel with the second sub-electrode wire. Therefore, it is possible to avoid the consecutive dark and bright stripes caused by the sub-electrode wires in the same row or column and running in the same direction.

Optionally, the first sub-electrode wire and the second sub-electrode wire are arranged in a form of a Chinese character "八" or an inverted Chinese character "八".

Optionally, the first sub-region and the second sub-region are arranged alternately.

The present disclosure will be described hereinafter in conjunction with the drawings and embodiments. The following embodiments are for illustrative purposes only, but shall not be used to limit the scope of the present disclosure.

Figure 4:
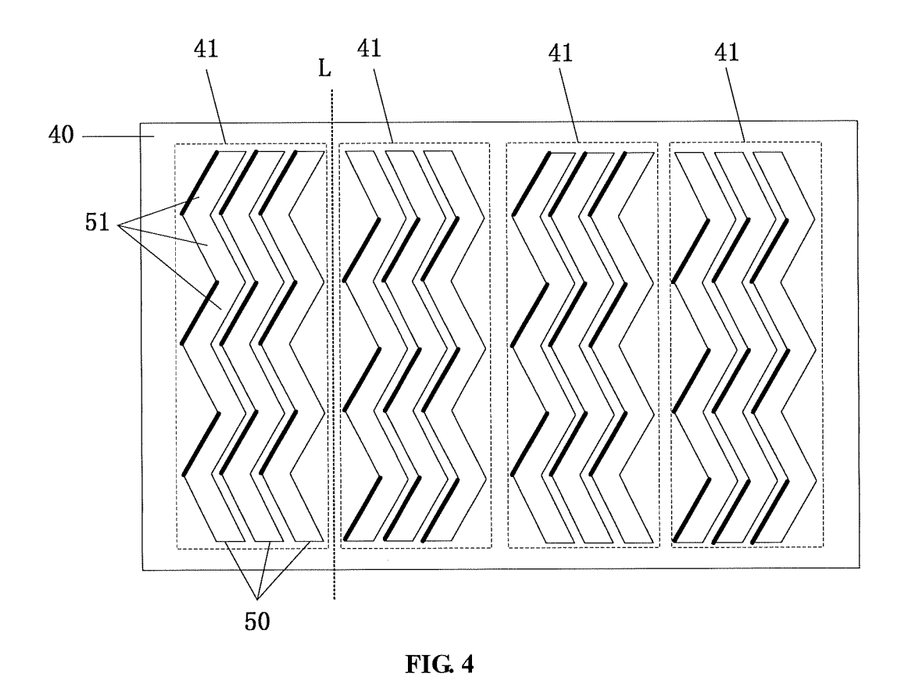
FIG. 4 is a schematic view of a touch screen in at least one embodiment of the present disclosure.

Referring to FIG. 4 which is a schematic view of a touch screen in at least one embodiment of the present disclosure, the touch screen includes a substrate 40 and a plurality of touch electrodes 50 on the substrate 40 arranged at the same layer and in a matrix. Each touch electrode 50 includes six sub-electrode wires 51, and the sub-electrode wires 51 are connected in sequence to form the polyline-shaped touch electrode 50. In the embodiments of the present disclosure, in each touch electrode 50, odd-numbered sub-electrode wires are arranged parallel and of an identical pattern, and even-numbered sub-electrode wires are arranged parallel and of an identical pattern. The substrate 40 includes a plurality of sub-regions 41, each sub-region 41 includes three touch electrodes 50, and the touch electrodes 50 at the same sub-region are of an identical pattern. The substrate 40 includes at least two sub-regions 41, and respective touch electrodes 50 of the two sub-regions 41 are of different patterns.

In the embodiments of the present disclosure, the sub-regions 41 of the substrate 40 are arranged in a matrix and of an identical size. FIG. 4 only shows four sub-regions 41 of the substrate 40, the four sub-regions 41 are in the same row. It can be seen from FIG. 4, at the sub-regions in the same row, the touch electrodes 50 at odd-numbered columns of sub-regions 41 are of an identical pattern, the touch electrodes 50 at even-numbered columns of sub-regions 41 are of an identical pattern, and respective touch electrodes 50 of two adjacent sub-regions 41 are of different patterns. In the embodiments of the present disclosure, respective touch electrodes 50 of two adjacent sub-regions 41 are symmetric with respect to a radial line L.

It can be seen from FIG. 4, among the sub-electrode wires 51 in the same row, a part of sub-electrode wires 51 extends in one direction, and the other part of sub-electrode wires 51 extends in the other direction. That is, the sub-electrode wires 51 in the same row may extend in different directions (i.e., not parallel). Therefore, when viewing the touch screen from a certain angle, light beams are only reflected by the edges of a part of the sub-electrode wires 51 in one row. Therefore, the consecutive dark and bright stripes are avoided, thereby optimizing the display effect.

In the embodiments of the present disclosure, the touch electrodes 50 are made of a transparent conductive material. Optionally, the touch electrodes 50 are made of a transparent metallic oxide (e.g., ITO, IZO).

In the embodiments of the present disclosure, the touch electrodes 50 are polyline-shaped. Compared with straight touch electrodes, the polyline-shaped touch electrodes may not form Moire fringes with pixel units of the display panel.

Figure 5:
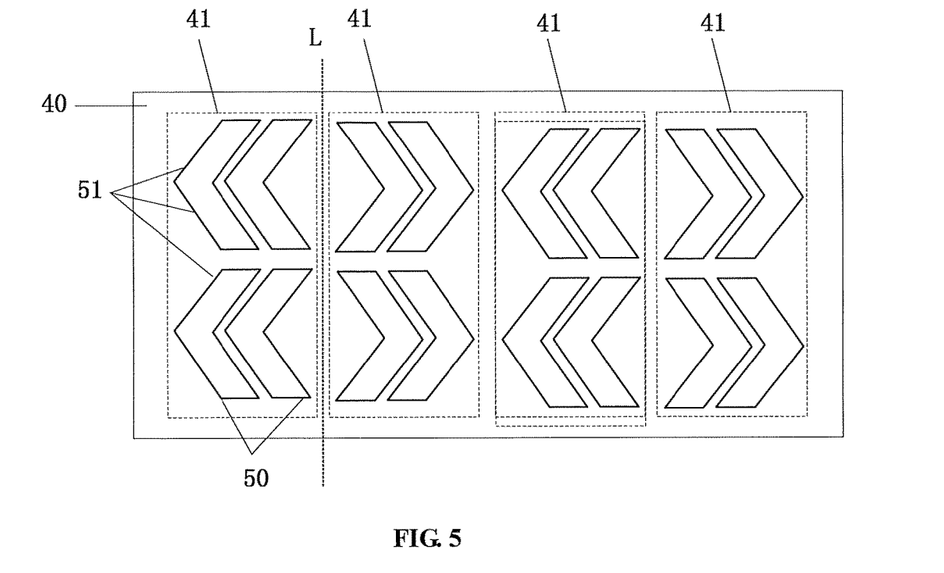
FIG. 5 is a schematic view of a touch screen in at least one embodiment of the present disclosure.

In the above embodiments, each touch electrode 50 includes six sub-electrode wires 51. In other embodiments of the present disclosure, a quantity of the sub-electrode wires 51 of each touch electrode 50 is not limited, and a polyline-shaped touch electrode wire may be formed as long as the touch electrode 50 includes at least two sub-electrode wires 51. Referring to FIG. 5, each touch electrode 50 includes two sub-electrode wires 51.

In the above embodiments, the substrate 40 includes a plurality of sub-regions 41 which are arranged in a matrix and of an identical size. Of course, in other embodiments of the present disclosure, the substrate 40 may include sub-regions 41 of different sizes, reference may be made to the embodiment of FIG. 6.

In the embodiment of FIG. 4, each sub-region 41 includes three touch electrodes 50. Of course, in other embodiments of the present disclosure, a quantity of the touch electrodes 50 in each sub-region 41 is not limited, as long as each sub-region 41 includes at least one touch electrode 50. Optionally, the sub-regions 41 may have different numbers of touch electrodes 50. For example, in the embodiment of FIG. 6, the sub-region 41 at the left side has eight touch electrodes 50, and the middle sub-region 41 only has four touch electrodes 50.

According to the above embodiments, the substrate 40 includes at least two sub-regions 41, and respective touch electrodes 50 of the two sub-regions 41 are of different shapes. Therefore, the sub-electrodes in the same row may extend in different directions, and the consecutive dark and bright stripes may not be generated when viewing the touch screen from a certain angle, thereby optimizing the display effect.

In the above embodiments, two connected sub-electrode wires of each touch electrode form a bending pattern. In the above embodiments, at two sub-regions having different shapes of touch electrodes, the bending patterns in the same row are bent in opposite directions, so that the sub-electrode wires in the same row and at the sub-regions having different shapes of touch electrodes are not parallel, thereby avoiding the alternate dark and bright stripes.

According to the above embodiments, the alternate dark and bright stripes are avoided by adjusting the bending directions of the bending patterns of a part of touch electrodes in the same row. Certainly, in other embodiments of the present disclosure, the above objective may be achieved by adjusting bending angles of the bending patterns of a part of touch electrodes in the same row.

Figure 7:
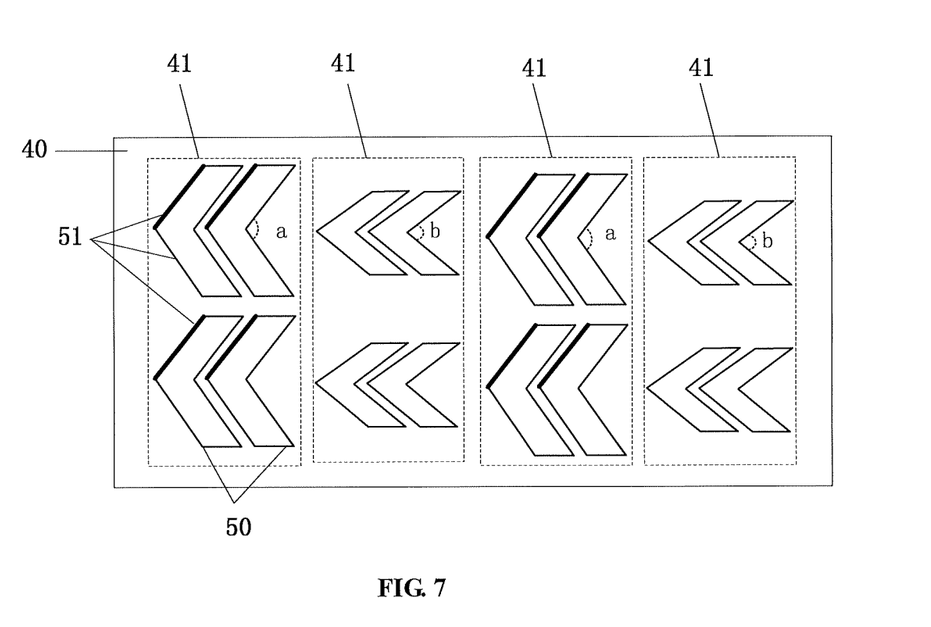
FIG. 7 is a schematic view of a touch screen in at least one embodiment of the present disclosure.

Referring to FIG. 7 which is a schematic view of a touch screen in at least one embodiment of the present disclosure, at the sub-regions 41 in the same row, the bending patterns of the touch electrodes 50 at odd-numbered columns of sub-regions 41 are bent by an angle a, the bending patterns of the touch electrodes 50 at even-numbered columns of sub-regions 41 are bent by an angle b, so that the sub-electrode wires 51 in the same row and at different sub-regions are not parallel and may not reflect light beams in the same direction. As a result, the consecutive dark and bright stripes may not appear when viewing the touch screen from a certain angle.

That is, in the embodiments of the present disclosure, the alternate dark and bright stripes may be avoided by adjusting the bending directions or angles of the bending patterns of a part of touch electrodes in the same row. Of course, more complicated, the above objective may be achieved by adjusting both the bending directions and angles of the bending patterns of a part of touch electrodes in the same row, or adjusting the bending directions of the bending patterns of one part of touch electrodes in the same row while adjusting the bending angles of the bending patterns of the other part of touch electrodes in the same row.

Figure 6:
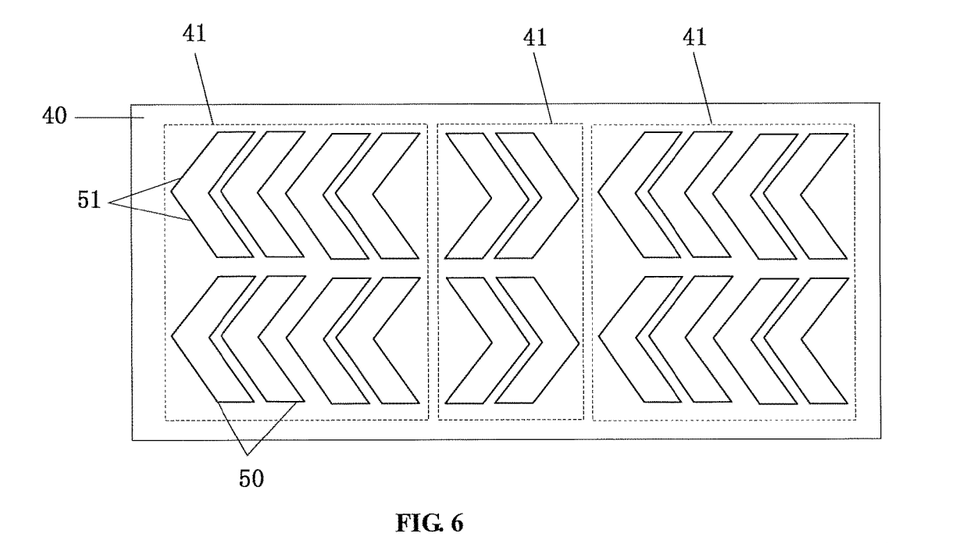
FIG. 6 is a schematic view of a touch screen in at least one embodiment of the present disclosure.

It can be seen from the embodiments of FIGS. 4, 5 and 6, the sub-regions 41 of the substrate 40 are arranged in a matrix, and the bending directions of the bending patterns of the touch electrodes at two adjacent sub-regions in the same row are different.

It can be seen from the embodiment of FIG. 7, the bending angles of the bending patterns of the touch electrodes at two adjacent sub-regions in the same row are different.

According to the above embodiments, the bending directions or angles of the touch electrodes at two adjacent sub-regions in the same row are different, thereby avoiding the horizontal alternate dark and bright stripes.

Figure 8:
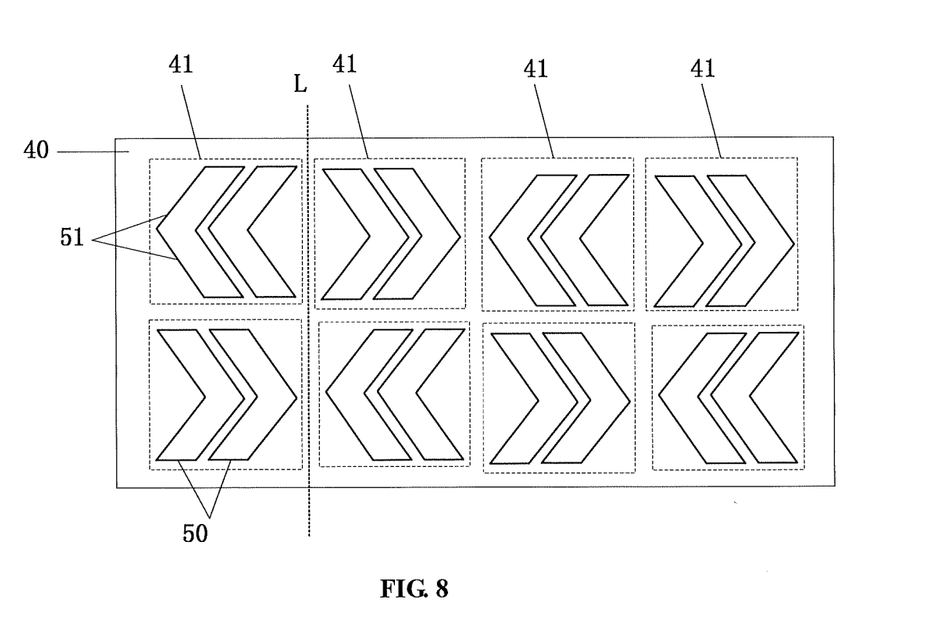
FIG. 8 is a schematic view of a touch screen in at least one embodiment of the present disclosure.

In other embodiments of the present disclosure, in order to avoid the longitudinal alternate dark and bright stripes, optionally the bending directions or angles of the touch electrodes at two adjacent sub-regions in the same column are different. Referring to FIG. 8, the bending directions of the touch electrodes at two adjacent sub-regions 41 in the same column are different, and the bending directions of the touch electrodes at two adjacent sub-regions 41 in the same row are also different. As such, both the horizontal and the longitudinal alternate dark and bright stripes may be avoided.

It can be seen from FIG. 8, among the sub-regions in the same row or column, the bending directions of the bending patterns of the touch electrodes at odd-numbered sub-regions are identical, the bending directions of the bending patterns of the touch electrodes at even-numbered sub-regions are identical, and the bending directions of the bending patterns of the touch electrodes at the odd-numbered sub-regions are different from the bending directions of the bending patterns of the touch electrodes at the even-numbered sub-regions. As such, both the horizontal and the longitudinal alternate dark and bright stripes may be avoided, and the arrangement may be simple since the entire substrate merely includes two kinds of touch electrodes.

In the above embodiments, each sub-region 41 includes at least one column and at least one row of touch electrodes 50. Referring to FIG. 4, each sub-region 41 includes one row and three columns of touch electrodes 51. Referring to FIG. 5, each sub-region 41 includes two rows and two columns of touch electrodes 51.

In the above embodiments, optionally, respective touch electrodes of two adjacent sub-regions in the same row or column are axisymmetric. Referring to FIGS. 4, 5 and 8, respective touch electrodes of two adjacent sub-regions in the same row are axisymmetric with respect to the radial line L Optionally, the touch screen in the above embodiments is a single-layer and out-cell touch screen.

The single-layer and out-cell touch screen may be a mutual-capacitive touch screen or a self-capacitive touch screen.

In the case that the touch screen in the embodiments of the present disclosure is a mutual-capacitive touch screen, the touch electrodes 50 include driving electrodes and sensing electrodes. Optionally, the driving electrodes are arranged at one of the two adjacent sub-regions 41 in the same row or column, and the sensing electrodes are arranged at the other of the two adjacent sub-regions 41 in the same row or column.

Figure 9:
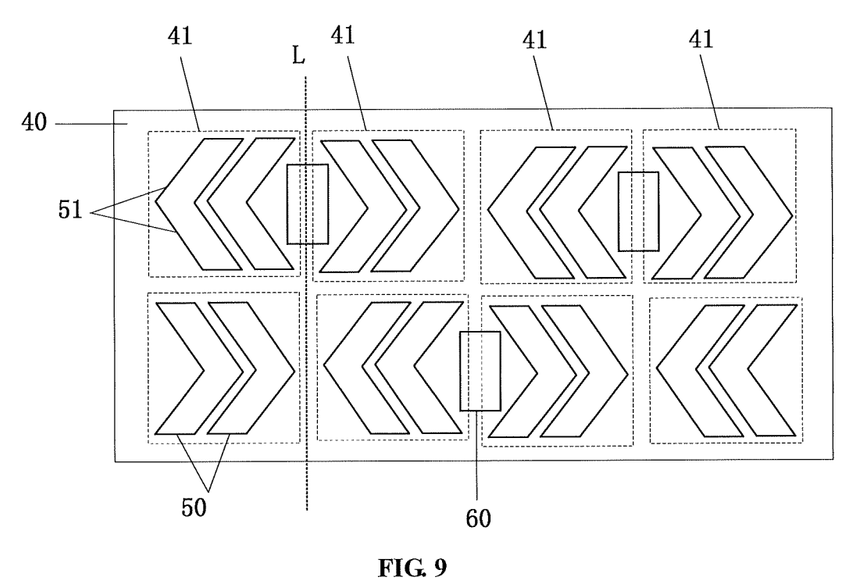
FIG. 9 is a schematic view of a touch screen in at least one embodiment of the present disclosure.

It can be seen from FIG. 8, the bending patterns of the touch electrodes at two adjacent sub-regions 41 in the same row are bent in opposite directions, so there may be a large blank region between two adjacent touch electrodes which are bent in different directions. When the blank regions appear regularly, a new visible issue may arise. In view of this, in some embodiments of the present disclosure, the touch screen may further include a supplementary pattern. The supplementary pattern is arranged between two adjacent sub-regions having different patterns of touch electrodes to fill a blank region between the two adjacent sub-regions having different patterns of touch electrodes. Referring to FIG. 9, the touch screen in some embodiments of the present disclosure further includes a supplementary pattern 60 which is arranged between two adjacent sub-regions having different patterns of touch electrodes to fill a blank region between the two adjacent sub-regions having different patterns of touch electrodes.

In the above embodiments, among the sub-regions in the same row, the touch electrodes at odd-numbered sub-regions are of an identical shape, and the touch electrodes at even-numbered sub-regions are of an identical shape. The odd-numbered sub-regions may be the above first sub-regions, and the even-numbered sub-regions may be the above second sub-regions. Each touch electrode at the first sub-region includes the above first sub-electrode wire, each touch electrode at the second sub-region includes the above second sub-electrode wire, the first sub-electrode wire and the second sub-electrode wire are in the same row, and the first sub-electrode wire is not parallel with the second sub-electrode wire.

Figure 10:
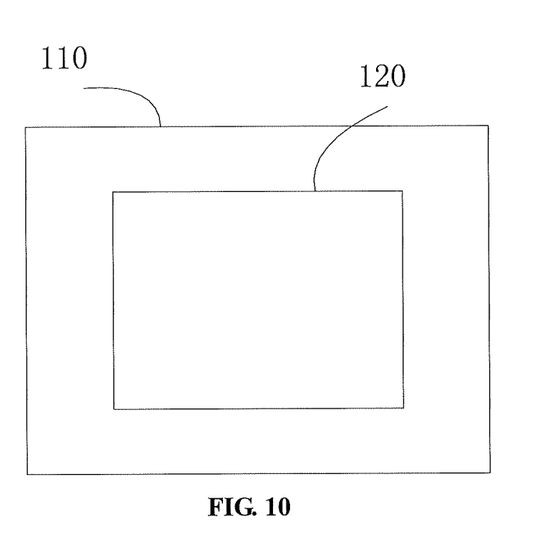
FIG. 10 is a schematic view of a touch device in at least one embodiment of the present disclosure.

The present disclosure further provides a touch device including the touch screen in any one of the above embodiments. FIG. 10 is a schematic view of a touch device 100 in some embodiments of the present disclosure, and the touch device 100 includes the touch screen 120 in any one of the above embodiments.

The above are merely the optional embodiments of the present disclosure. A person skilled in the art may make further modifications and improvements without departing from the principle of the present disclosure, and these modifications and improvements shall also fall within the scope of the present disclosure.

What is claimed is:

1. A touch screen, comprising a substrate and a plurality of touch electrodes on the substrate arranged at a same layer and in a matrix, wherein each of the plurality of touch electrode comprises at least two sub-electrode wires, and the at least two sub-electrode wires are connected in sequence to form a polyline shape;
the substrate comprises a plurality of sub-regions, each of the plurality of sub-region comprises at least one touch electrode having an identical pattern, and the touch electrodes in adjacent sub-regions are provided with distinct patterns.

2. The touch screen according to claim 1, wherein the sub-regions are arranged in a matrix, the sub-regions in a same row or column comprise at least a first sub-region and a second sub-region, and a pattern of the at least one touch electrode of the first sub-region is different from a pattern of the at least one touch electrode of the second sub-region.

3. The touch screen according to claim 2, wherein the first sub-region comprises a first sub-electrode wire, the second sub-region comprises a second sub-electrode wire, the first sub-electrode wire and the second sub-electrode wire are in a same row or column, and the first sub-electrode wire is not parallel with the second sub-electrode wire.

4. The touch screen according to claim 3, wherein the first sub-electrode wire and the second sub-electrode wire are arranged in a form of a Chinese character "八" or an inverted Chinese character "八".

5. The touch screen according to claim 4, wherein the touch electrodes comprise a driving electrode and a sensing electrode, the driving electrode is arranged at one of two adjacent sub-regions in a same row or column, and the sensing electrode is arranged at the other of the two adjacent sub-regions in the same row or column.

6. The touch screen according to claim 3, wherein the touch electrodes comprise a driving electrode and a sensing electrode, the driving electrode is arranged at one of two adjacent sub-regions in a same row or column, and the sensing electrode is arranged at the other of the two adjacent sub-regions in the same row or column.

7. The touch screen according to claim 2, wherein a bending angle of the at least one touch electrode of the first sub-region is different from a bending angle of the at least one touch electrode of the second sub-region.

8. The touch screen according to claim 7, wherein the touch electrodes comprise a driving electrode and a sensing electrode, the driving electrode is arranged at one of two adjacent sub-regions in a same row or column, and the sensing electrode is arranged at the other of the two adjacent sub-regions in the same row or column.

9. The touch screen according to claim 2, wherein the first sub-region and the second sub-region are arranged alternately.

10. The touch screen according to claim 9, wherein the touch electrodes comprise a driving electrode and a sensing electrode, the driving electrode is arranged at one of two adjacent sub-regions in a same row or column, and the sensing electrode is arranged at the other of the two adjacent sub-regions in the same row or column.

11. The touch screen according to claim 2, wherein the plurality of sub-regions is of an identical size.

12. The touch screen according to claim 11, wherein each sub-region comprises at least one row of touch electrodes and at least one column of touch electrodes.

13. The touch screen according to claim 12, wherein among the sub-regions in a same row or column, the touch electrodes at odd-numbered sub-regions are of an identical pattern, the touch electrodes at even-numbered sub-regions are of an identical pattern, and the pattern of the touch electrodes of the odd-numbered sub-regions is different from the pattern of the touch electrodes the even-numbered sub-regions.

14. The touch screen according to claim 13, wherein the touch electrode of a sub-region is arranged axisymmetrically with the touch electrode of an adjacent sub-region in a same row or column.

15. The touch screen according to claim 12, wherein the touch electrodes comprise a driving electrode and a sensing electrode, the driving electrode is arranged at one of two adjacent sub-regions in a same row or column, and the sensing electrode is arranged at the other of the two adjacent sub-regions in the same row or column.

16. The touch screen according to claim 11, wherein the touch electrodes comprise a driving electrode and a sensing electrode, the driving electrode is arranged at one of two adjacent sub-regions in a same row or column, and the sensing electrode is arranged at the other of the two adjacent sub-regions in the same row or column.

17. The touch screen according to claim 2, wherein the touch electrodes comprise a driving electrode and a sensing electrode, the driving electrode is arranged at one of two adjacent sub-regions in a same row or column, and the sensing electrode is arranged at the other of the two adjacent sub-regions in the same row or column.

18. The touch screen according to claim 1, further comprising a supplementary pattern, wherein the supplementary pattern is arranged between two adjacent sub-regions having different touch electrode patterns to fill a blank region between the two adjacent sub-regions.

19. The touch screen according to claim 1, wherein the touch screen is a single-layer and out-cell touch screen.

20. A touch device comprising a touch screen comprising a substrate and a plurality of touch electrodes on the substrate arranged at a same layer and in a matrix, wherein each of the plurality of touch electrode comprises at least two sub-electrode wires, and the at least two sub-electrode wires are connected in sequence to form a polyline shape;

the substrate comprises a plurality of sub-regions, each of the plurality of sub-region comprises at least one touch electrode having an identical pattern, and the touch electrodes in adjacent sub-regions are provided with distinct patterns.

* * * * *